United States Patent Office 3,535,290
Patented Oct. 20, 1970

3,535,290
PROCESS FOR PREPARING POLYMERIC
ANHYDRIDES
Russell G. Hay, Gibsonia, Philip G. Irwin, Verona, and Charles M. Selwitz, Pitcairn, Pa., assignors to Gulf Research & Development Company, Pittsburgh, Pa., a corporation of Delaware
No Drawing. Filed Jan. 12, 1968, Ser. No. 697,325
Int. Cl. C08f 19/02
U.S. Cl. 260—78.5                                    9 Claims

ABSTRACT OF THE DISCLOSURE

Polyanhydrides, which may be cross-linked with monooxirane compounds to prepare resins, prepared from maleic anhydride and refinery streams containing various hydrocarbons including olefinic or vinyl hydrocarbons and alkanes containing tertiary carbon atoms, particularly naphthenes such as methylcyclopentane, produce discolored polyanhydrides. The discoloration, surprisingly, appears to arise from the presence of the cycloalkane. Dissolution of the raw polymer in many common solvents such as chloroform followed by precipitation by an alcohol such as methanol result in a gummy discolored precipitate. As described in the specification, which follows, only certain unique solvents for the raw polyanhydride such as acetone, and certain nonsolvents for the pure polyanhydride, such as isopropanol, are useful and their use is critical to success.

---

This invention relates to the preparation of light colored polyanhydrides containing a plurality of reactive succinic anhydride groups, from highly discolored polyanhydrides, and the preparation of synthetic resins from polyanhydrides.

Polyanhydrides prepared from maleic anhydride and olefinic compounds such as hexene-1, styrene, and the like, are useful in preparing higher polymers, plastics, adhesives, coatings and the like, when cross-linked with an epoxy compound such as epichlorohydrin or glycidyl methacrylate. In seeking a less expensive source of olefins, it was found that refinery streams containing a mixture of unsaturated olefin and vinyl hydrocarbon compounds and various other materials such as alkylcycloalkanes or naphthenes and aromatic compounds gave a polyanhydride when reacted with maleic anhydride in the presence of a free radical initiator. The polyanhydride and a polymer prepared therefrom with epichlorohydrin were dark in color—a disadvantage for many uses.

Investigation leads toward the conclusion, surprisingly, that the saturated cycloalkanes containing a tertiary carbon atom (naphthenes) are related to the discoloration. In an effort to locate the material or materials causing the discoloration, each of the major constitutents of a refinery stream were separately combined with maleic anhydride in the presence of a peroxide catalyst under polymerization conditions. Unexpectedly, a low molecular weight highly colored polyanhydride was recovered when methylcyclopentane was combined with maleic anhydride. It is believed the tertiary carbon atom of the methylcyclopentane permits disproportionation or isomerization of a methylcyclopentyl radical formed during the reaction, but it is not intended that the invention be limited to such hypothesis. Naphthenes, such as methylcyclopentane, cannot be readily separated from refinery streams by distillation (azeotropes may form) or solvent extraction (desirable components may also be extracted). This leaves polyanhydride purification as the most logical method to obtain a color-free or light colored material if in fact there are separate polyanhydride fractions, only part of which are discolored. Attempts to utilize solvents such as hexane, toluene, chloroform, benzene, etc., to dissolve the raw or crude polyanhydride and selectively precipitate a colorless polyanhydride, as with methanol, resulted in a solution of the material, but in precipitation a colored, gummy mass was obtained. Such results suggest that there are not polyanhydride fractions, some color-free and some discolored, but that all polyanhydride molecules provide discoloration.

It has now been found that there are in fact separable polyanhydride fractions, a low molecular weight discolored fraction and a high molecular weight relatively color-free fraction, that only certain solvents for the raw polyanhydride and nonsolvents for the color-free fraction are effective, and their use is critical to success. Further, when elevated temperatures are used in the solvent extraction it has been found that there is the likelihood of oxygenated solvents such as alcohols reacting with anhydride groups in the polyanhydride.

The only solvents for the raw polymer which have been found to be useful are low boiling liquid carbonyl compounds such as acetone, 2-butanone, 3-pentanone, acetophenone, cyclopentanone, cyclohexanone and the like. The dialkyl and cycloalkyl ketones having up to about 9 carbon atoms are preferred, and acetone or methyl ethyl ketone is particularly preferred. By low boiling is meant those solvents having a boiling point below 200° C. at atmospheric pressure. The only useful non-solvents for the purified color-free fraction which, in conjunction with said solvent for the raw or crude polyanhydride, serve to retain only the highly colored fraction in solution are low boiling monohydric alkanols having up to about 8 carbon atoms, such as isopropanol, ethanol, methanol, propanol, butanol and the like. Isopropanol is preferred. The foregoing solvents are useful when the procedure is conducted at about room temperature. The temperature should be below about 90° C. preferably between about 20° C. and 50° C. A further unexpected advantage is that the pure polyanhydride is precipitated in a filterable, solid particulate form.

In the catalytic or thermal cracking of higher molecular weight hydrocarbons, the products, or fractions separated therefrom, contain mixtures of olefinic and vinyl hydrocarbons, along with other compounds. These mixtures, for example may contain two or more of the following polymerizable olefins and vinyl hydrocarbons:

| | |
|---|---|
| ethylene | 3,3-dimethyl-1-pentene |
| propylene | 1-octene |
| 1-butene | 2-methyl-1-heptene |
| 2-butene | 3,3-dimethyl-1-hexene |
| 1-pentene | 1-nonene |
| 2-pentene | 4-nonene |
| 2-methyl-1-butene | 4,4-dimethyl-1-heptene; |
| 1-hexene | 1-decene |
| 3-hexene | 2-decene |
| 4-methyl-1-pentene | styrene |
| 1-heptene | cyclohexene |
| 3-ethyl-2-pentene | dicyclopentadiene |
| methylcyclopentenes | methylcyclopentadiene | and the like.

The present invention is concerned only with such refinery streams which also contain one or more of alkanes having tertiary carbon atoms, particularly certain naphthenes having alkyl groups on the ring; i.e., ethyl and methyl cyclopentanes and cyclohexanes. Examples of such naphthenes are methylcyclopentane, dimethylcyclopentane, trimethylcyclopentane, ethylcyclopentane, methylcyclohexane, dimethylcyclohexane, trimethylcyclohexane, ethylcyclohexane, and methylethylcyclohexane. Other alkanes having teritiary carbon atoms may also undergo copolymerization with maleic anhydride and the invention is also useful where the feed stock contains such compounds as may cause discolored polyanhydrides or low molecular weight fractions, such as the following:

| | |
|---|---|
| isobutane | isopentane |
| triethylmethane | 2-methylpentane |
| 3-methylpentane | 2,2,3-trimethylpentane |
| 2,2,4-trimethylpentane | 2,3-dimethylhexane |
| 2,3,3-trimethylpentane | 2,3,4-trimethylpentane |
| 2,4-dimethylhexane | 2,5-dimethylhexane |
| 3,4-dimethylhexane | | and the like.

The invention is also useful for removing the relatively low molecular weight polyanhydrides, whether discolored or not, and any unreacted monomers.

A typical refinery stream is an ethylene plant aromatic distillate which has, for example, the following composition:

TABLE I

[Properties: Bromine No.—105; Gravity, API—32.6°; Distillation—172°–372° F.]

| Component [a] | Weight, percent |
|---|---|
| Benzene | 42 |
| Toluene | 7.6 |
| Styrene | 1.5 |
| Cyclohexene | 2.7 |
| Dicyclopentadiene | 8.6 |
| Methylcyclopentane | 4 |
| Methylcyclopentadiene | 6 |
| Xylenes | 1 |
| Ethylbenzene, naphthalene | 1 |
| Methylcyclopentenes (three isomers) | About 24 |

[a] Concentration variable depending on treatment and can have dicyclopentadiene up to 22 percent.

Similarly, the gasoline fraction ($C_5$–400° F.) of thermally cracked light naphtha or full-range naphtha may be reacted with maleic anhydride. One benefit is the removal of gum-forming unsaturated compounds from this fraction. The other benefit, of course, is that an inexpensive source of vinyl compounds, olefins, and α-olefins is provided. The resulting polyanhydride is improved by treatment according to the present invention.

The polyanhydride to be purified is prepared by combining maleic anhydride with the olefin-containing feed stock to provide about 2 to 3 moles of the maleic anhydride per mole of —CH=$CH_2$ and or non-aromatic —CH=CH—unsaturation, in the presence of a mutual solvent (e.g., the aromatics in the feed stock), at a temperature between about 60° C. and 100° C., using as a catalyst between about 2% and 3% by weight of benzoyl peroxide based on maleic anhydride. At least two succinic anhydride groups are present in the polyanhydride. The copolymer is then recovered and dried. In lieu of benzoyl peroxide, other free radical initiators such as heat, ultraviolet light, lauryl or tertiary butyl peroxide, azo compounds such as α,α'-azo-bis-isobutyronitrile, etc. are useful. Lower temperatures are useful in the presence of a catalyst promotor such as the ferrous, silver, sulfate or thiosulfate ions. Pressure need only be great enough to maintain the materials in the liquid phase.

The purified polyanhydride containing two or more succinic anhydride groups per molecule has various uses, included among which are the preparation of resins by reacting any mono-oxirane compound therewith in which the polyanhydride is soluble, using a tertiary amine catalyst. Examples of useful monooxirane compounds containing a single oxirane oxygen atom as the only functional group are methyl glycidyl ether, epichlorohydrin, 1,2-epoxy propane, 1,2-epoxy dodecane, 1,2-epoxy-2-butoxypropane, cyclohexene oxide, cyclooctene oxide, 7,8-epoxyhexadecane, styrene oxide, 1,2-epoxy-2-phenoxy-propane, and the like. Also useful are the olefinically unsaturated monooxirane compounds containing as the only functional group a single oxirane oxygen atom and an olefinic bond capable of being polymerized by free radical means, examples of which are glycidyl methacrylate, 3,4-epoxy-butane-1, 2-methyl-3-keto-4,5-epoxy pentene-1, vinyl 7,8-epoxy octanoate, and the like. The main criteria for selecting the liquid epoxy compound is solubility of the polyanhydride therein. The anhydride group or epoxy group ratio on an equivalency basis is from about 0.45:1 to about 0.6:1. After dissolution of the polyanhydride, a tertiary amine curing agent is incorporated in the solution, in the amount of 0.5–3% by weight of the solution. Suitable curing agents include trimethylamine, tri-n-heptylamine, phenylamine, N,N-dimethylaniline, pyridine, 3-picoline, 2-ethylpyridine, 4-phenylpyridine, quinoline, and the like.

The following examples illustrate preferred modes of practicing the invention, although it is not intended that the invention be limited thereto unless so specified.

EXAMPLE 1

Polyanhydrides, dark in color, were prepared as described above from maleic anhydride and the distillate described in Table I above. They were then dissolved in each of benzene, chloroform, hexane, and toluene, at room temperature. When the solution was poured into rapidly agitated methanol, ethanol, propanol, or isopropanol, a sticky, discolored precipitate was obtained.

EXAMPLE 2

When acetone was used as the solvent for the crude polyanhydride of Example 1, and the solution was poured into an equal volume of rapidly agitated isopropanol, all materials being at room temperature, the discolored fraction containing low molecular weight polyanhydride was retained in solution and the pure light colored fraction precipitated as a finely divided filterable solid. The bottoms (discolored fraction) was also recovered. The properties of the products are as follows:

| Run No. | Mol. wt. Crude | Mol. wt. Pure | Viscosity Crude | Viscosity Pure | Wt. percent free MA [1] Crude | Wt. percent free MA [1] Pure | Mol. wt. bottoms |
|---|---|---|---|---|---|---|---|
| 1 | 815 | 2,190 | 0.085 | 0.105 | 0.32 | 0.00 | 295 |
| 2 | 433 | 1,340 | 0.117 | 0.156 | 0.10 | 0.00 | 410 |
| 3 | 485 | 1,060 | 0.085 | 0.096 | | | 445 |

[1] MA=Maleic anhydride.

The viscosity was the dilute solution viscosity measured at 77° F. of a solution of 5 grams of the ployanhydride per deciliter of acetone.

EXAMPLE 3

Polymers were prepared from the crude and the pure polyanhydrides described in Example 2, by dissolving the polyanhydrides in epichlorohydrin, using an anhydride group to epoxy group ratio of 0.5 on an equivalency basis. The catalyst, 1% by weight of the solution of 3-picoline, was added, the solution was cast, and the resin was then cured at room temperature. The properties of the products were as follows:

BARCOL 935 HARDNESS

| Run No. | Crude | Pure |
|---|---|---|
| 1 | 22 | 82 |
| 2 | 0 | 56 |
| 3 | 15 | 41 |

Although the invention has been described in considerable detail with reference to certain preferred embodiments thereof, it will be understood that variations and modifications can be effected without departing from the spirit and scope of the invention as described hereinabove and as defined in the appended claims.

We claim:
1. In the preparation of polyanhydrides from maleic anhydride and a refinery stream containing a mixture of olefinic hydrocarbons and contaminated with a naphthene or alkane having at least 1 tertiary carbon atom, by a free radical mechanism, wherein there is formed a discolored or low molecular weight polyanhydride fraction and a relatively color-free fraction of relatively high molecular weight, the improvement comprising the steps of dissolving the crude polyanhydride in a ketone having a boiling point below 200° C., which ketone is a liquid solvent for said crude polyanhydride, mixing the solution with a low boiling point monohydric alkanol having up to about 8 carbon atoms which alkanol is a liquid nonsolvent for the color-free high molecular weight polyanhydride, which nonsolvent, together with the solvent for the crude polyanhydride, is a solvent for the colored or low molecular weight fraction, the combined solvents being such that the color-free fraction is insoluble therein, whereby a relatively color-free polyanhydride is precipitated, and recovering the relatively color-free polyanhydride.

2. The method of claim 1 in which said solvent for the crude polyanhydride is acetone or methyl ethyl ketone and said nonsolvent is isopropanol, methanol, ethanol or propanol.

3. The method of claim 2 in which said solvent is acetone and said nonsolvent is isopropanol.

4. The method of claim 3 in which said refinery stream contains cycloalkenes and aromatic hydrocarbons.

5. The method of claim 4 in which a cyclopentadiene is present.

6. The method of claim 1 in which said refinery stream is from the cracking of hydrocarbons.

7. The method of claim 6 in which the refinery stream is the aromatic distillate from a cracking process in which the main product is a lower α-olefin.

8. The method of claim 1 in which said stream contains a cyclopentadiene.

9. The method of claim 1 wherein said precipitation of said relatively color-free polyanhydride is carried out at a temperature below about 90° C.

References Cited

UNITED STATES PATENTS

| | | | |
|---|---|---|---|
| 3,268,477 | 8/1966 | Mueller | 260—47 |
| 2,142,980 | 1/1939 | Huijser et al. | 260—82 |
| 3,279,975 | 10/1966 | Yoshii et al. | 162—168 |
| 3,379,663 | 4/1968 | Takei et al. | 260—23.7 |

FOREIGN PATENTS 793,070  4/1958  Great Britain.

OTHER REFERENCES

Picco Resins, Pennsylvania Indust. Chem. Corp., 1959, p. 8.

JOSEPH L. SCHOFER, Primary Examiner

C. A. HENDERSON, JR., Assistant Examiner

U.S. Cl. X.R.

260—2, 32.8, 33.2, 82